United States Patent
Chung

(10) Patent No.: US 9,450,404 B2
(45) Date of Patent: Sep. 20, 2016

(54) CURRENT DISTRIBUTION APPARATUS

(71) Applicant: City University of Hong Kong, Kowloon (HK)

(72) Inventor: Shu Hung Henry Chung, Mid-Levels (HK)

(73) Assignee: City University of Hong Kong, Hong Kong (HK)

( * ) Notice: Subject to any disclaimer, the term of this patent is extended or adjusted under 35 U.S.C. 154(b) by 500 days.

(21) Appl. No.: 13/836,087

(22) Filed: Mar. 15, 2013

(65) Prior Publication Data

US 2014/0266146 A1    Sep. 18, 2014

(51) Int. Cl.
*H01F 38/00*    (2006.01)
*H02J 3/00*     (2006.01)
*H01F 30/04*    (2006.01)

(52) U.S. Cl.
CPC .......... *H02J 3/00* (2013.01); *H01F 30/04* (2013.01)

(58) Field of Classification Search
None
See application file for complete search history.

(56) References Cited

U.S. PATENT DOCUMENTS

2008/0061708 A1*    3/2008    Wi et al. ............... 315/277

* cited by examiner

*Primary Examiner* — Carlos Amaya
*Assistant Examiner* — Aqeel Bukhari
(74) *Attorney, Agent, or Firm* — Renner Kenner Greive Bobak Taylor & Weber

(57) ABSTRACT

A current distribution apparatus comprising a common current source arranged to deliver an input current into a plurality of branches such that the input current is distributed into a plurality of individual branch currents, wherein each of the plurality of branches includes an inductive arrangement arranged to form an inductive coupling with an associated inductive arrangement of at least one other associated branch.

11 Claims, 3 Drawing Sheets

CURRENT DISTRIBUTION APPARATUS

TECHNICAL FIELD

The present invention relates to a current distribution apparatus and particularly, although not exclusively, to a transformer circuit for distributing a single source electric current into a plurality of branches.

BACKGROUND

One of the fundamental ideas of current distribution is to divide a larger current into a number of smaller currents in order to better suit particular applications. An advantage of this arrangement is that more electrical devices may be powered from a single power source but a difficulty is that not all devices can be powered from the same source as different electrical devices have different characteristics. Also, certain electrical devices may not operate or may be damaged if the current in the circuit or network is too large.

In real life, for example in domestic electric circuits, a large current may be divided into a number of current branches each with a smaller current to operate a number of ceiling lamps, motors, radios, television sets, hairdryers, music audio systems and computers, or other electric appliances. However, known distribution systems are complex or otherwise inefficient.

SUMMARY OF THE INVENTION

In accordance with a first aspect of the present invention, there is provided a current distribution apparatus comprising a common current source arranged to deliver an input current into a plurality of branches such that the input current is distributed into a plurality of individual branch currents; wherein each of the plurality of branches includes an inductive arrangement arranged to form an inductive coupling with an associated inductive arrangement of at least one other associated branch.

In an embodiment of the first aspect, the input current is distributed into the plurality of individual branch currents based on at least one predetermined ratio.

In an embodiment of the first aspect, the inductive arrangement of each branch comprises a first coil and a second coil.

In an embodiment of the first aspect, the at least one predetermined ratio is associated with a number of turns of the first coil and a number of turns of the second coil.

In an embodiment of the first aspect, the first coil of each branch is inductively coupled with the second coil of an adjacent branch.

In an embodiment of the first aspect, the first coil of each branch and the second coil of an adjacent branch together defines a transformer unit.

In an embodiment of the first aspect, the number of transformer units equals the number of branches.

In an embodiment of the first aspect, the transformer units are connected in a daisy-chained manner.

In an embodiment of the first aspect, the first coils are primary coils of the transformer units and the second coils are secondary coils of the transformer units.

In an embodiment of the first aspect, the primary coil and the secondary coil of each transformer unit are disposed in adjacent branches.

In an embodiment of the first aspect, the primary coil of each transformer unit is disposed on the same branch with the secondary coil of an adjacent transformer unit.

In an embodiment of the first aspect, the primary coils each comprises a first number of turns of coils and the secondary coils each comprises a second number of turns of coils.

In an embodiment of the first aspect, each transformer unit has a turn ratio defined by the first number of turns of coils of the primary coil and the second number of turns of coils of the secondary coil.

In an embodiment of the first aspect, the at least one predetermined ratio is determined by at least one of the turn ratio of at least one of the transformer units.

In an embodiment of the first aspect, the branch current in each individual branch relates to the input current by:

$$i_k = \frac{\prod_{j=1}^{k} n_j}{n_1 + n_1 n_2 + \ldots + n_1 n_2 \ldots n_k + n_1 n_2 \ldots n_N} i_M,$$

in which $i_k$ is the branch current in the k-th branch, $n_k$ is a turn ratio of the k-th transformer unit and $i_M$ is the input current to be distributed.

In an embodiment of the first aspect, a summation of the individual branch current of each of the plurality of individual branches is substantially equal to the input current.

In an embodiment of the first aspect, each branch current is independent of a voltage difference across the respective branch.

In accordance with a second aspect of the present invention, there is provided a current distribution apparatus comprising a plurality of interconnecting transformer units arranged to distribute an input current into a plurality of current branches based a predetermined ratio.

In an embodiment of the second aspect, each transformer unit has a primary coil and a secondary coil; and wherein each transformer unit has a turn ratio defined by a number of turns of coils of the primary coil and a number of turns of coils of the secondary coil.

In an embodiment of the second aspect, the predetermined ratio is associated with the turn ratios of the transformer units.

In an embodiment of the second aspect, a current of each current branch is independent of a voltage difference across the respective current branch.

In an embodiment of the second aspect, the primary coil of each transformer unit is disposed on the same branch with the secondary coil of an adjacent transformer unit.

In an embodiment of the second aspect, the primary coil and the secondary coil of each transformer unit are disposed in adjacent current branches.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1:
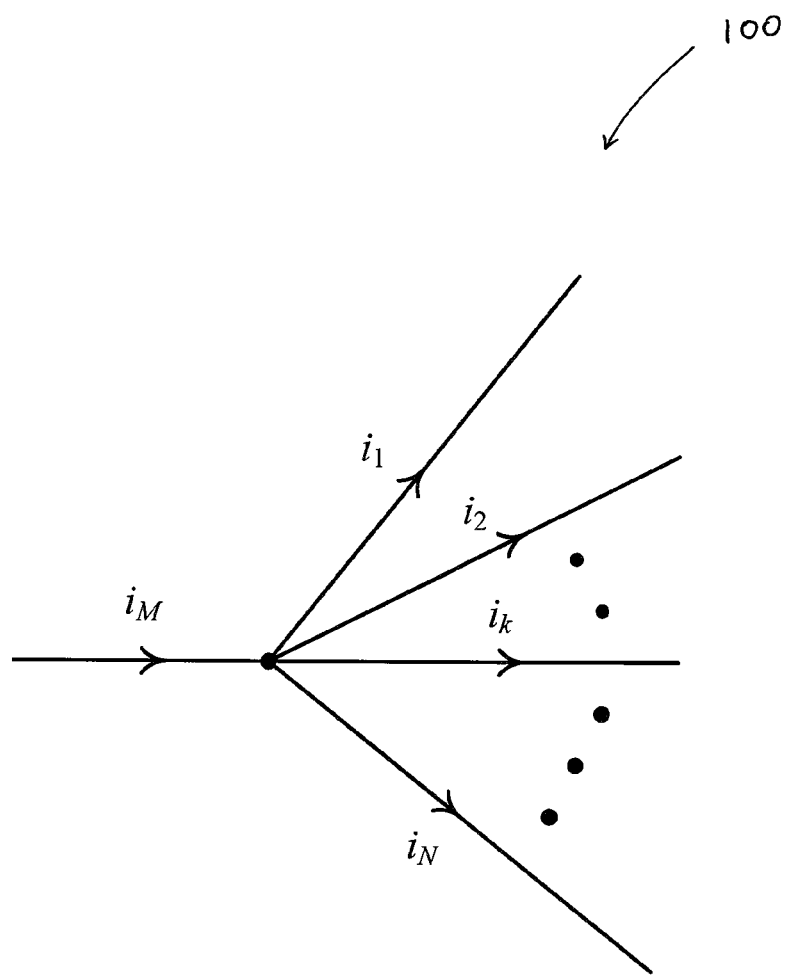
FIG. 1 is a diagram illustrating a simplified current distribution scheme.

Referring to FIG. 1, there is shown a diagram illustrating a simplified current distribution scheme 100. The inventors through their research, trials and experimentation have devised that an alternating electric current can be divided into a plurality of branches based a plurality of predefined parameters. For example, as shown in FIG. 1, a main current $i_M$ is shared among N branches where the currents in the branches are denoted as $i_1, i_2, \ldots, i_k, \ldots, i_N$. More specifically, the main current is related to the branch currents by the following equation:

$$i_1 + i_2 + \ldots + i_k + \ldots + i_N = i_M \tag{1}$$

Preferably, the currents are alternating current (AC). In some other embodiments, however, the currents may also be direct currents (DC) in another embodiment.

Figure 2:
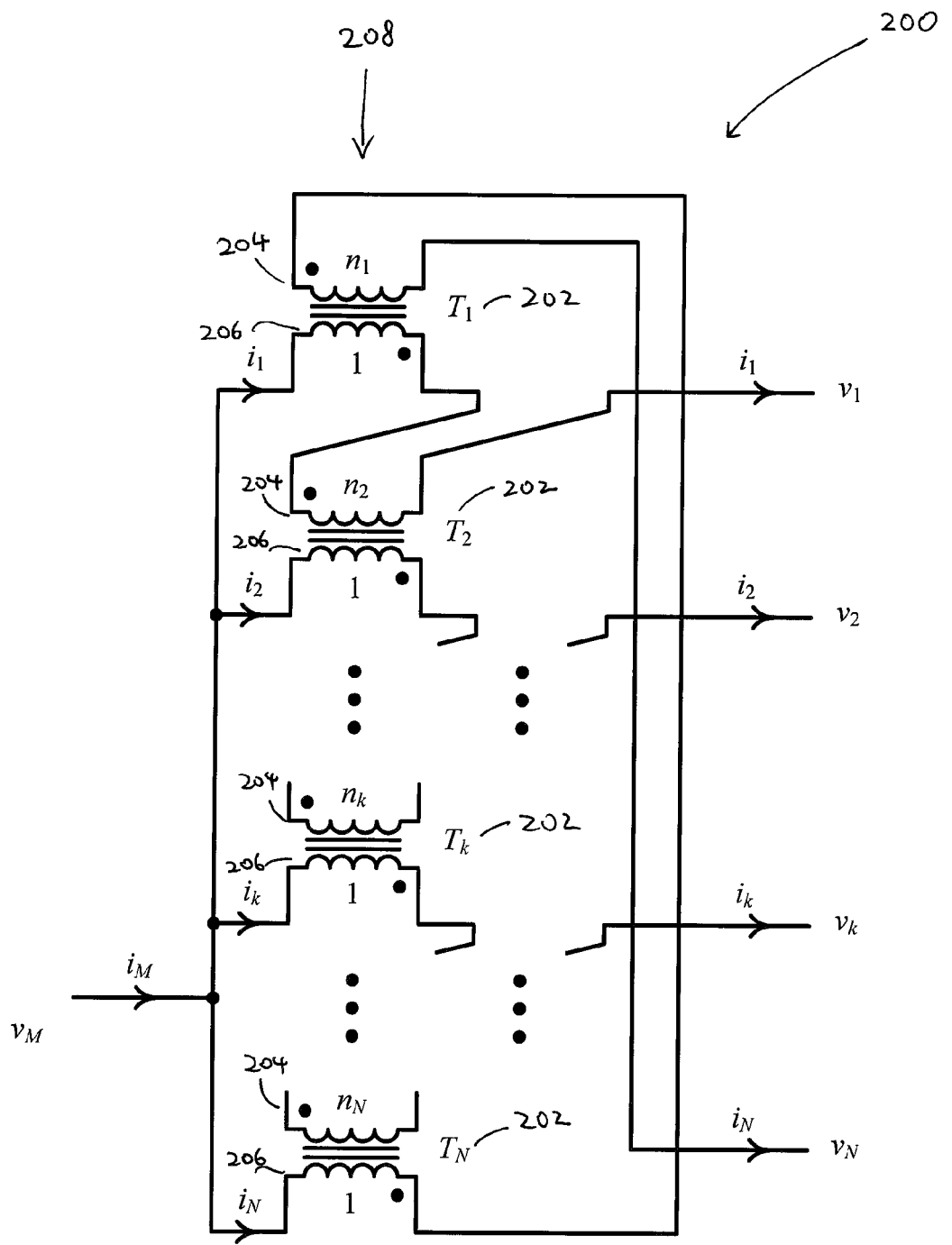
FIG. 2 is a diagram illustrating a current distribution apparatus in accordance with one embodiment of the present invention.

With reference to FIG. 2, there is illustrated an embodiment of a current distribution apparatus 200 comprising a common current source arranged to deliver an input current $i_M$ into a plurality of branches such that the input current $i_M$ is distributed into a plurality of individual branch currents; wherein each of the plurality of branches includes an inductive arrangement arranged to form an inductive coupling with an associated inductive arrangement of at least one other associated branch.

In this embodiment, the current distribution apparatus 200 is constructed by a number of magnetically coupled inductive components (transformers or transformer units) 202 connected in a daisy chained structure 208. As shown in FIG. 2, the primary coil 206 and the secondary coil 204 of each transformer unit 202 are disposed in adjacent branches. In particular, the primary coil 206 of each transformer unit 202 is disposed in the same branch as the secondary coil 204 of an adjacent transformer unit 202. Preferably, the required number of the transformers 202 is equal to the number of branches.

In this embodiment, the current flowing through each branch is determined by the turns ratios (ratio of the number of turns of coils in the primary coil 206 to the number of turns of coils in the secondary coil 204) of the transformers 202, i.e. $n_1, n_2, \ldots, n_k, \ldots, n_N$. Ideally, all transformers 202 have infinite magnetizing inductances. Accordingly, the currents in the branches can be expressed as follows:

$$i_1 = n_1 i_N \tag{2}$$

$$i_2 = n_2 i_1 \tag{3}$$

$$\vdots$$

$$i_k = n_k i_{k-1} \tag{4}$$

$$\vdots$$

$$i_N = n_N i_{N-1} \tag{5}$$

Thus, substituting equations (2) to (5) into equation (1), it can be shown that $$i_k = \frac{\prod_{j=1}^{k} n_j}{n_1 + n_1 n_2 + \ldots + n_1 n_2 \ldots n_k + n_1 n_2 \ldots n_N} i_M \tag{6}$$

In other words, equation (6) shows that the current in any one of the branches will depend on the turn ratios of the transformers 202 of the current distribution apparatus 200. In particular, an advantage of this embodiment is that the current division is substantially independent of the branch voltages $v_1, v_2, \ldots, v_k, \ldots, v_N$, and $v_M$.

Furthermore, in one particular embodiment, when $n_1 = n_2 = \ldots = n_k = \ldots = n_N = 1$, $$i_1 = i_2 = \ldots = i_k = \ldots = i_N = \frac{1}{N} i_M \tag{7}$$

This is advantageous in that the current $i_M$ is equally shared by the branches.

Figure 3:
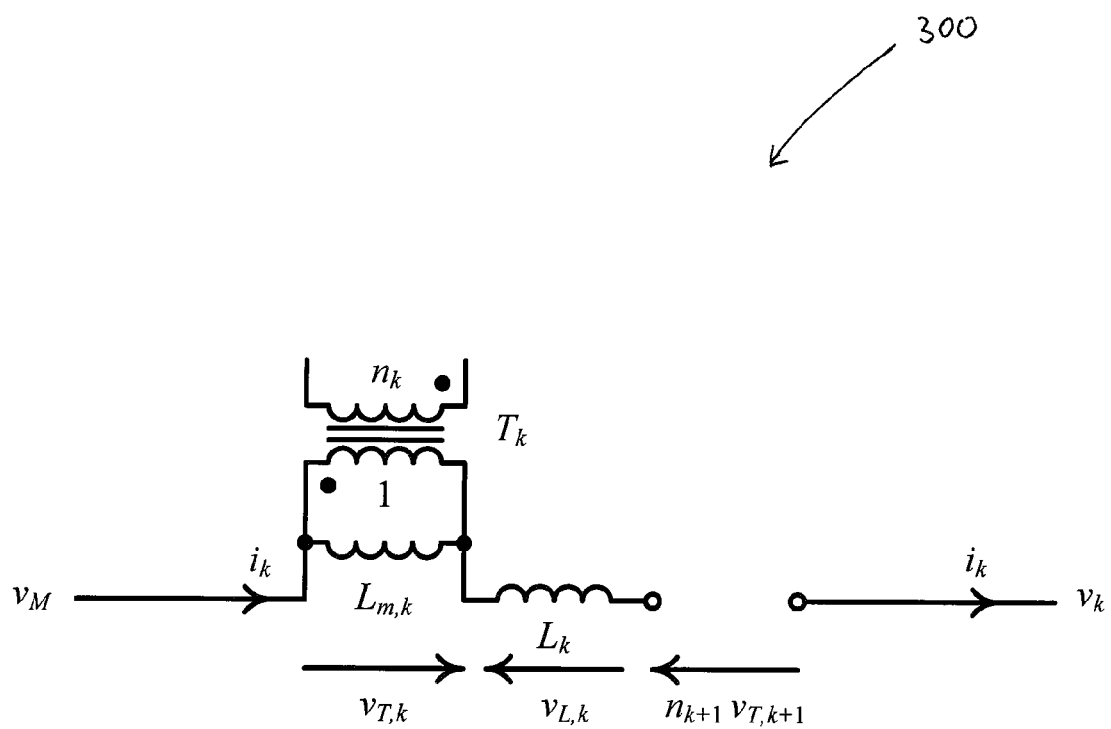
FIG. 3 is a diagram illustrating a branch of the current distribution apparatus of FIG. 2.

With reference to FIG. 3, there is shown a branch 300 of the current distribution apparatus of FIG. 2. In reality, practical transformers may have finite magnetizing inductance, leakage inductance, and resistance. FIG. 3 shows the equivalent circuit of the k-th branch, in which $L_{m,k}$ is the magnetizing inductance of the transformer $T_k$ and $L_k$ is the equivalent series inductance of the branch. Preferably, $L_k$ includes the leakage inductance of the transformer. In some embodiments, the resistance can be neglected.

By applying the Kirchhoff's voltage law to the branch 300, it can be shown that $$v_M + v_{T,k} - v_{L,k} - n_{k+1} v_{T,k+1} - v_k = 0 \tag{8}$$

in which $v_{T,k}$ is the voltage across the magnetizing inductance $L_{m,k}$ of the transformer $T_k$, $v_{L,k}$ is the voltage across the equivalent series inductance $L_k$ of the branch 300, $v_M$ is the voltage at the input, $n_k$ is the turn ratio of the transformer $T_k$ and $v_k$ is the voltage at the output of the branch 300.

Accordingly, by using equation (8) for the N branches, it can be shown that the voltages $v_{T,k}$, $v_{L,k}$, $v_M$ and $v_k$ are related to the turn ratio $n_k$ of the transformer $T_k$ by the following:

$$\begin{bmatrix} -1 & n_2 & 0 & 0 & \ldots & 0 & 0 \\ 0 & -1 & n_3 & 0 & 0 & \ldots & 0 \\ \vdots & \vdots & \vdots & \ddots & \ddots & \ddots & \vdots \\ 0 & 0 & \ldots & -1 & n_k & \ldots & 0 \\ \vdots & \vdots & \ddots & \ddots & \ddots & \ddots & \vdots \\ 0 & 0 & \ldots & 0 & \ldots & -1 & n_N \\ n_1 & 0 & \ldots & 0 & \ldots & 0 & -1 \end{bmatrix} \begin{bmatrix} v_{T,1} \\ v_{T,2} \\ \vdots \\ v_{T,k} \\ \vdots \\ v_{T,N-1} \\ v_{T,N} \end{bmatrix} = \tag{9}$$

$$\begin{bmatrix} v_M - v_1 \\ v_M - v_2 \\ \vdots \\ v_M - v_k \\ \vdots \\ v_M - v_{N-1} \\ v_M - v_N \end{bmatrix} - \begin{bmatrix} v_{L,1} \\ v_{L,2} \\ \vdots \\ v_{L,k} \\ \vdots \\ v_{L,N-1} \\ v_{L,N} \end{bmatrix}$$

On the other hand, in this embodiment, the voltage $v_{L,k}$ across the equivalent series inductance $L_k$ of the k-th branch can be expressed as:

$$v_{L,k} = s L_k i_k \tag{10}$$

where $s = j\omega$ is the Laplace operator and $\omega$ is the operating frequency.

By using equation (10) for N branches, it can be shown that $$\begin{bmatrix} v_{L,1} \\ v_{L,2} \\ \vdots \\ v_{L,k} \\ \vdots \\ v_{L,N-1} \\ v_{L,N} \end{bmatrix} = \begin{bmatrix} sL_1 & 0 & 0 & 0 & \ldots & 0 & 0 \\ 0 & sL_2 & 0 & 0 & 0 & \ldots & 0 \\ \vdots & \vdots & \vdots & \ddots & \ddots & \ddots & \vdots \\ 0 & 0 & \ldots & sL_k & 0 & \ldots & 0 \\ \vdots & \vdots & \ddots & \ddots & \ddots & \ddots & \vdots \\ 0 & 0 & \ldots & 0 & \ldots & sL_{N-1} & 0 \\ n_1 & 0 & \ldots & 0 & \ldots & 0 & sL_N \end{bmatrix} \begin{bmatrix} i_1 \\ i_2 \\ \vdots \\ i_k \\ \vdots \\ i_{N-1} \\ i_N \end{bmatrix} \quad (11)$$

This illustrates that the voltage $v_{L,k}$ across the equivalent series inductance $L_k$ of the k-th branch is related to the current $i_k$ of the k-th branch.

In this embodiment, as illustrated above, the current among difference branches are inter-related. Furthermore, by applying the Kirchhoff's current law, it can be shown that $$-n_k i_{k-1} + i_k = -\frac{v_{T,k}}{sL_{m,k}} \quad (12)$$

in which $n_k$ is the turn ratio of the transformer $T_k$, $i_k$ is the current in the k-th branch, $L_{m,k}$ is magnetizing inductance of the transformer $T_k$, $v_{T,k}$ is the voltage across the magnetizing inductance $L_{m,k}$ of the transformer $T_k$ and $s=j\omega$ is the Laplace operator where w is the operating frequency. Preferably, in the above expression, when k=1, (k-1)=N.

By arranging equation (12) into matrix form, the following equation can be obtained:

$$\begin{bmatrix} 1 & 0 & 0 & 0 & \ldots & 0 & -n_1 \\ -n_2 & 1 & 0 & 0 & 0 & \ldots & 0 \\ \vdots & \vdots & \ddots & \ddots & \ddots & \ddots & \vdots \\ 0 & 0 & \ldots & -n_k & 1 & \ldots & 0 \\ \vdots & \vdots & \ddots & \ddots & \ddots & \ddots & \vdots \\ 0 & 0 & \ldots & 0 & \ldots & 1 & 0 \\ 0 & 0 & \ldots & 0 & \ldots & -n_k & 1 \end{bmatrix} \begin{bmatrix} i_1 \\ i_2 \\ \vdots \\ i_k \\ \vdots \\ i_{N-1} \\ i_N \end{bmatrix} = \quad (13)$$

-continued $$\begin{bmatrix} -\frac{1}{sL_{m,1}} & 0 & 0 & 0 & \ldots & 0 & 0 \\ 0 & -\frac{1}{sL_{m,2}} & 0 & 0 & 0 & \ldots & 0 \\ \vdots & \vdots & \ddots & \ddots & \ddots & \ddots & \vdots \\ 0 & 0 & \ldots & -\frac{1}{sL_{m,k}} & 0 & \ldots & 0 \\ \vdots & \vdots & \ddots & \ddots & \ddots & \ddots & \vdots \\ 0 & 0 & \ldots & 0 & \ldots & -\frac{1}{sL_{m,N-1}} & 0 \\ 0 & 0 & \ldots & 0 & \ldots & 0 & -\frac{1}{sL_{m,N}} \end{bmatrix} \begin{bmatrix} v_{T,1} \\ v_{T,2} \\ \vdots \\ v_{T,k} \\ \vdots \\ v_{T,N-1} \\ v_{T,N} \end{bmatrix}$$

As shown in equation (13), the voltage $v_{T,k}$ across the magnetizing inductance of the transformer $T_k$ is related to the current $i_k$ in the k-th branch.

In this embodiment, by further using equations (9), (11) and (13) (eliminating $v_{T,k}$ and $v_{L,k}$ from equation (9)), it can be shown that $$\begin{bmatrix} i_1 \\ i_2 \\ \vdots \\ i_k \\ \vdots \\ i_{N-1} \\ i_N \end{bmatrix} = [Y] \begin{bmatrix} v_M - v_1 \\ v_M - v_2 \\ \vdots \\ v_M - v_k \\ \vdots \\ v_M - v_{N-1} \\ v_M - v_N \end{bmatrix} \quad (14)$$

where $[Y]=[Z]^{-1}$ and $$[Z] = \begin{bmatrix} sL_{m,1} + n_2^2 sL_{m,2} + sL_1 & -n_2 sL_{m,2} & 0 & 0 & \ldots & 0 & -n_1 sL_{m,1} \\ -n_2 sL_{m,2} & sL_{m,2} + n_3^2 sL_{m,3} + sL_2 & -n_3 sL_{m,3} & 0 & 0 & \ldots & 0 \\ \vdots & \vdots & \ddots & \ddots & \ddots & \ddots & \vdots \\ 0 & 0 & \ldots & -n_k sL_{m,k} & sL_{m,k} + n_{k+1}^2 sL_{m,k+1} + sL_k & -n_{k+1} sL_{m,k+1} & 0 \\ \vdots & \vdots & \ddots & \ddots & \ddots & \ddots & \vdots \\ 0 & 0 & \ldots & 0 & \ldots & sL_{m,N-1} + n_N^2 sL_{m,N} + sL_{N-1} & 0 \\ -n_1 sL_{m,1} & 0 & \ldots & 0 & \ldots & -n_N sL_{m,N} & sL_{m,N} + n_1^2 sL_{m,1} + sL_N \end{bmatrix}$$

Equation (14) shows the relationship of the current $i_k$ in the k-th branch and the voltage difference $v_M - v_k$ across the respective branch. In a preferred embodiment, [Z] is arranged such that the current $i_k$ of the k-th branch is substantially independent of the voltage difference $v_M - v_k$ across the respective branch.

A further illustration of the current distribution apparatus in one embodiment is provided as follows. In this example, the current distribution apparatus is arranged to have three branches. In the following, $v_M$, $v_1$, $v_2$, and $v_3$ are dc voltages. By arranging the magnetization inductance in each branch to be the same ($L_{m,1}=L_{m,2}=L_{m,3}=L_m$), and the equivalent series inductance in each branch to be the same ($L_1=L_2=L_3=L$), it can be shown that $$i_1(t) = \frac{L(v_M - v_1) + L_m(3v_M - v_1 - v_2 - v_3)}{L(L + 3L_m)} t \quad (15)$$

$$i_2(t) = \frac{L(v_M - v_2) + L_m(3v_M - v_1 - v_2 - v_3)}{L(L + 3L_m)}t \quad (16)$$

$$i_3(t) = \frac{L(v_M - v_3) + L_m(3v_M - v_1 - v_2 - v_3)}{L(L + 3L_m)}t \quad (17)$$

Advantageously, in this embodiment, it can be observed that if $L_m$ is large, the currents i(t) of the three branches will be substantially the same.

Although in the above example, the current distribution apparatus is arranged to have three branches. However, in some other embodiments, the current distribution apparatus may have any number of branches and the current in each branch may not necessarily have to be equal.

One particular advantage of the current distribution apparatus in the present invention is that the current in each branch is substantially independent of the voltage across the branch. This would mean that the current distribution apparatus is relatively immune from the voltage fluctuations and changes in the circuit or network. Another advantage of the current distribution apparatus in the present invention is that the current in individual branches can be flexibly manipulated by controlling the turn ratios of the transformer units. Also, the current distribution ratio of the apparatus will be less susceptible to current fluctuations in individual branches.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A current distribution apparatus comprising:
a common current source; and
a plurality of branches in connection with the common current source, each of the plurality of branches including a first coil and a second coil;
wherein the common current source is arranged to distribute an input current into the plurality of branches such that the input current is divided into a plurality of individual branch currents in the plurality of branches; and
wherein the first coil of each branch is respectively inductively coupled with the second coil of an adjacent branch to define a transformer unit so that the current distribution apparatus comprises a plurality of transformer units that are connected in a daisy chained manner.

2. A current distribution apparatus in accordance with claim 1, wherein the input current is distributed into the plurality of individual branch currents based on at least one predetermined ratio.

3. A current distribution apparatus in accordance with claim 2, wherein the at least one predetermined ratio is associated with a number of turns of the first coil and a number of turns of the second coil.

4. A current distribution apparatus in accordance with claim 1, wherein the number of the plurality of transformer units equals the number of the plurality of branches.

5. A current distribution apparatus in accordance with claim 1, wherein the first coil is a primary coil of a transformer unit and the second coil is a secondary coil of a transformer unit.

6. A current distribution apparatus in accordance with claim 5, wherein the primary coils each comprises a first number of turns of coils and the secondary coils each comprises a second number of turns of coils.

7. A current distribution apparatus in accordance with claim 6, wherein each transformer unit has a turn ratio defined by the first number of turns of coils of the primary coil and the second number of turns of coils of the secondary coil.

8. A current distribution apparatus in accordance with claim 7, wherein the at least one predetermined ratio is determined by at least one of the turn ratio of at least one of the transformer units.

9. A current distribution apparatus in accordance with claim 8, wherein the branch current in each individual branch relates to the input current by $$i_k = \frac{\prod_{j=1}^{k} n_j}{n_1 + n_1 n_2 + \ldots + n_1 n_2 \ldots n_k + n_1 n_2 \ldots n_N} i_M,$$

in which $i_k$ is the branch current in the k-th branch, $n_k$ is a turn ratio of the k-th transformer unit and $i_M$ is the input current to be distributed.

10. A current distribution apparatus in accordance with claim 1 wherein a summation of the individual branch current of each of the plurality of individual branches is substantially equal to the input current.

11. A current distribution apparatus in accordance with claim 1, wherein each branch current is independent of a voltage difference across the respective branch.

* * * * *